United States Patent
Horvath

(10) Patent No.: US 11,273,780 B2
(45) Date of Patent: Mar. 15, 2022

(54) METHOD FOR OCCUPANT PROTECTION OF A MOTOR VEHICLE COMPRISING A STEER-BY-WIRE STEERING SYSTEM

(71) Applicants: thyssenkrupp Presta AG, Eschen (LI); thyssenkrupp AG, Essen (DE)

(72) Inventor: Gergely Horvath, Fülöpszállás (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/962,369

(22) PCT Filed: Jan. 29, 2019

(86) PCT No.: PCT/EP2019/052047
§ 371 (c)(1),
(2) Date: Jul. 15, 2020

(87) PCT Pub. No.: WO2019/149671
PCT Pub. Date: Aug. 8, 2019

(65) Prior Publication Data
US 2021/0061208 A1  Mar. 4, 2021

(30) Foreign Application Priority Data
Jan. 31, 2018  (DE) ............... 10 2018 102 103.8

(51) Int. Cl.
*B60R 21/013* (2006.01)
*B60R 21/015* (2006.01)
(Continued)

(52) U.S. Cl.
CPC ...... *B60R 21/013* (2013.01); *B60R 21/01552* (2014.10); *B60R 21/203* (2013.01);
(Continued)

(58) Field of Classification Search
CPC ........ B62D 1/181; B62D 1/183; B62D 1/197; B62D 5/006; B62D 5/04; B62D 6/00;
(Continued)

(56) References Cited

U.S. PATENT DOCUMENTS 6,227,571 B1 * 5/2001 Sheng ............... B62D 1/197
280/731
8,899,623 B2 * 12/2014 Stadler ............... B62D 1/192
280/777
(Continued)

FOREIGN PATENT DOCUMENTS

CN      203793405 U    8/2014
CN      104192198 A    12/2014
(Continued)

OTHER PUBLICATIONS

English Translation of International Search Report issued in PCT/EP2019/052047, dated May 10, 2019.

*Primary Examiner* — Paul N Dickson
*Assistant Examiner* — Caitlin Anne Miller
(74) *Attorney, Agent, or Firm* — thyssenkrupp North America, LLC

(57) ABSTRACT

Methods and systems for operating a vehicle occupant protection device of a steer-by-wire steering system. The system includes a steering wheel and an adjustable steering column connected to the steering wheel which can be adjusted between a retracted position and a deployed position via an adjustment mechanism. The steer-by-wire steering system has a feedback actuator to which a driver's request for a steering angle can be applied by a driver via the steering wheel, and which outputs a feedback signal to the steering wheel in response to the driver's request and a driving state of the motor vehicle. The method includes detecting an accident, detecting a hands-off situation or a hands-on situation, and when a hands-off situation has been (Continued)

detected, moving the steering column into an accident position by means of the adjustment mechanism, and triggering a steering wheel airbag during or after the adjustment process.

8 Claims, 4 Drawing Sheets

(51) Int. Cl.
*B60R 21/203* (2006.01)
*B62D 1/11* (2006.01)
*B62D 1/181* (2006.01)
*B62D 1/183* (2006.01)
*B62D 5/00* (2006.01)
*B62D 5/04* (2006.01)
*B62D 6/00* (2006.01)

(52) U.S. Cl.
CPC ............... *B62D 1/11* (2013.01); *B62D 1/181* (2013.01); *B62D 1/183* (2013.01); *B62D 5/006* (2013.01); *B62D 5/04* (2013.01); *B62D 6/00* (2013.01)

(58) Field of Classification Search
CPC ....... B62D 1/11; B60R 21/013; B60R 21/203; B60R 21/00; B60R 21/01552
See application file for complete search history.

(56) References Cited

U.S. PATENT DOCUMENTS

| | | | |
|---|---|---|---|
| 9,550,514 B2* | 1/2017 | Schulz | B60R 21/264 |
| 9,630,644 B2* | 4/2017 | Soderlind | B62D 1/181 |
| 9,764,756 B2* | 9/2017 | Sugioka | B60N 2/06 |
| 10,343,706 B2* | 7/2019 | Lubischer | B62D 1/19 |
| 10,457,323 B2* | 10/2019 | Rohrmoser | B62D 15/025 |
| 10,899,378 B2* | 1/2021 | Park | B62D 1/197 |
| 2007/0296193 A1* | 12/2007 | Bacher | B62D 1/181 |
| | | | 280/748 |
| 2014/0028008 A1 | 1/2014 | Stadler | |
| 2014/0260761 A1 | 9/2014 | Soderlind | |
| 2018/0127023 A1 | 5/2018 | Fuzes et al. | |
| 2018/0319422 A1 | 11/2018 | Polmans et al. | |
| 2019/0241213 A1* | 8/2019 | Szepessy | B62D 6/008 |
| 2019/0263445 A1 | 8/2019 | Fuzes et al. | |
| 2020/0346682 A1* | 11/2020 | Forte | B62D 5/0409 |
| 2020/0398891 A1* | 12/2020 | Szepessy | B62D 5/006 |

FOREIGN PATENT DOCUMENTS

| | | |
|---|---|---|
| CN | 107592845 A | 1/2018 |
| CN | 108290602 A | 7/2018 |
| DE | 4105821 A | 8/1992 |
| DE | 10 2007 035 751 A | 1/2009 |
| DE | 10 2012 014 762 A | 1/2014 |
| DE | 10 2014 006 550 B | 10/2015 |
| DE | 10 2016 125 839 A | 7/2017 |
| EP | 2 923 918 A | 9/2015 |
| WO | 2005085012 A | 9/2005 |
| WO | 2009003830 A | 1/2009 |

* cited by examiner

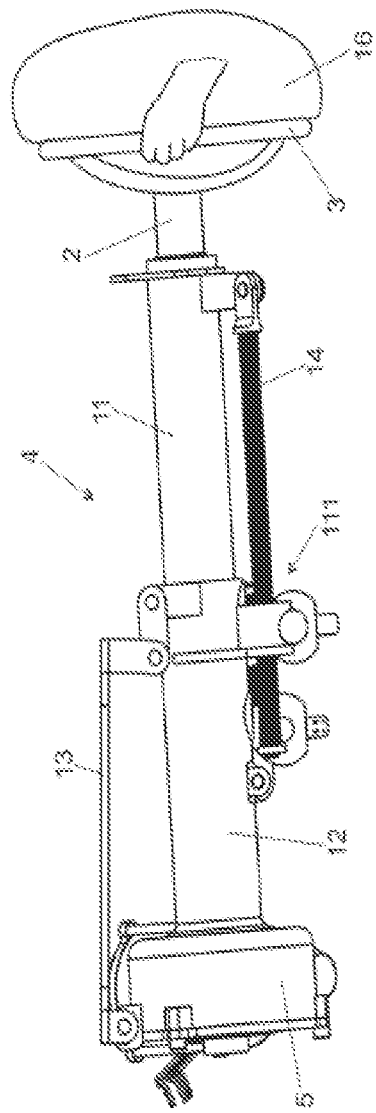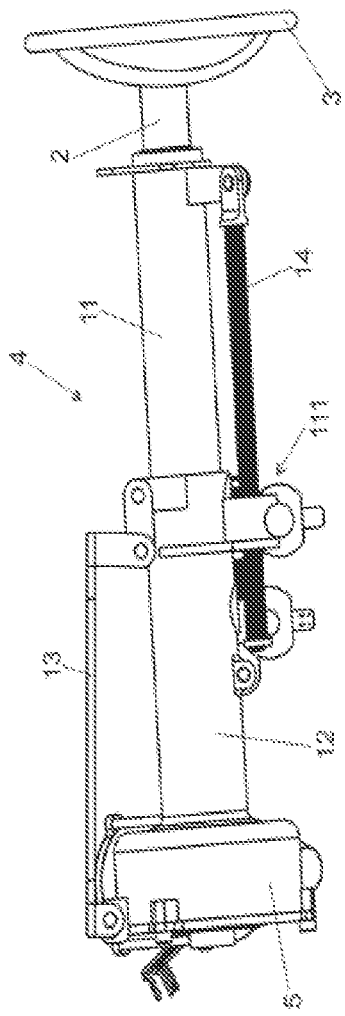

METHOD FOR OCCUPANT PROTECTION OF A MOTOR VEHICLE COMPRISING A STEER-BY-WIRE STEERING SYSTEM

CROSS REFERENCE TO RELATED APPLICATIONS

This application is a U.S. National Stage Entry of International Patent Application Serial Number PCT/EP2019/052047, filed Jan. 29, 2019, which claims priority to German Patent Application No. DE 10 2018 102 103.8, filed Jan. 31, 2018, the entire contents of both of which are incorporated herein by reference.

FIELD

The present disclosure generally relates to a method for operating a vehicle occupant protection device of a steer-by-wire steering system.

BACKGROUND

In steer-by-wire steering systems, the position of the steered wheels is not coupled directly to the steering wheel. There is a connection between the steering wheel and the steered wheels by means of electrical signals. The driver's steering request is tapped by a steering angle sensor, and the position of the steered wheels is controlled in accordance with the driver's steering request by means of a steering actuator. A mechanical connection to the wheels is not provided. In order to simulate the reactions of the row on the steering wheel with steer-by-wire steering it is necessary to provide on the steering wheel or the steering column a feedback actuator (FBA) which impresses a steering sensation in accordance with the reactions of the steering handle.

Steer-by-wire steering systems have a multiplicity of driver assistance systems which can make an autonomous or semi-autonomous driving mode of the motor vehicle possible. In an autonomous driving mode, the motor vehicle can detect the surroundings of the motor vehicle using various sensors of the driver assistance system and can control the motor vehicle completely automatically by specifying predetermined values. In contrast, in a semi-autonomous driving mode, the driver assistance system steers automatically by specifying a predetermined steering lock angle. This is the case, for example, during a semi-autonomous parking process. In this context, the driver assistance system assumes the steering of the motor vehicle, and the driver activates the accelerator pedal and the brake. In contrast, in a manual driving mode the driver assumes the control of the motor vehicle.

In a vehicle head-on impact there are, depending on the driving mode, different conditions which should be ideally taken into account in order to protect the driver.

Laid-open Patent Application DE 10 2012 014 762 A1 discloses a vehicle occupant protection arrangement in which in the event of a vehicle head-on impact the steering wheel can be moved between a first and a second position before the driver impacts against the airbag. In this case, in the event of the vehicle head-on impact the steering wheel moves toward the driver. This movement is disadvantageous since the time between the vehicle head-on impact and the impacting of the driver against the steering wheel is reduced, which increases the risk of injury.

Thus a need exists for a method for operating a vehicle occupant protection device which reduces the risk of injury to the driver.

BRIEF DESCRIPTION OF THE FIGURES

FIG. 3 is a schematic view of an adjustable steering column of a steer-by-wire steering system in a hands-on situation during an accident.

FIG. 4 is a schematic view of an adjustable steering column of a steer-by-wire steering system in a hands-off situation before an accident.

DETAILED DESCRIPTION

Figure 1:
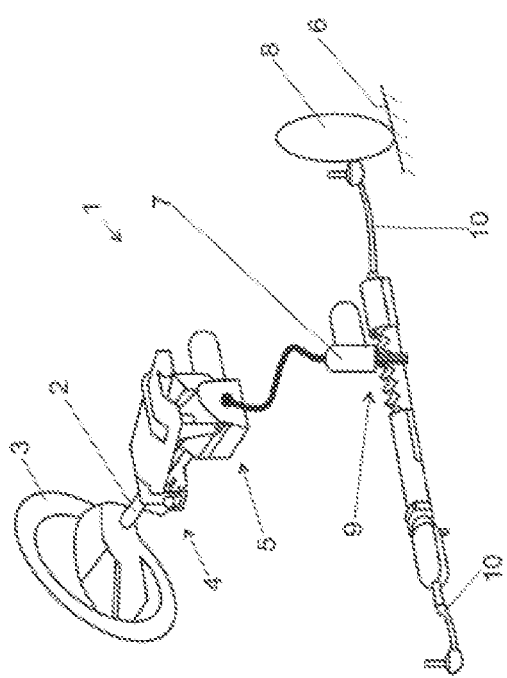
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for operating a vehicle occupant protection device of a steer-by-wire steering system and to a steer-by-wire steering system for motor vehicles.

In the text which follows a situation in which the driver has gripped the steering wheel is referred to as a hands-on situation, and a situation in which the driver has not gripped the steering wheel is referred to as hands-free travel, that is to say a hands-off situation, which corresponds to the terms used in these technical fields.

A method for operating a vehicle occupant protection device of a steer-by-wire steering system is provided, wherein the steer-by-wire steering system comprises a steering wheel and an adjustable steering column which is connected to the steering wheel and can be adjusted between a retracted position and a deployed position by means of an adjustment mechanism, and wherein the steer-by-wire steering system has a feedback actuator to which a driver's request for a steering angle can be applied by a driver via the steering wheel, and which outputs a feedback signal to the steering wheel in response to the driver's request and a driving state of the motor vehicle. The method comprises the following steps: detecting an accident, detecting a hands-off situation or a hands-on situation, if a hands-off situation has been detected, moving the steering column into an accident position by means of the adjustment mechanism and triggering a steering wheel airbag during the adjustment process or after the adjustment process. The position of the steering wheel can therefore be adapted to the situation (hands-on or hands-off), as a result of which the risk of injury to the driver can be reduced. The adjustment mechanism adjusts the steering column, in particular in terms of length, here.

In the case in which a hands-on situation has been detected after detection of an accident, the steering wheel airbag is preferably triggered in the current position of the steering column. There is no provision for adjustment of the steering column here.

In a preferred embodiment, the accident position comprises the retracted position of the steering column.

The detected accident is preferably a vehicle head-on impact.

There can further be provision that for the case in which an accident has been detected and a hands-off situation has been detected, the steering wheel is rotated into an advantageous rotational position by means of the feedback actuator. It is preferred here if the advantageous rotational position is the neutral position of the steering wheel.

The method preferably comprises the step that when the driver impacts against the steering wheel, the energy which is input into the steering wheel is absorbed by means of an energy absorption device.

The adjustment mechanism preferably has an electric motor with a threaded rod drive which shifts an inner steering column tube of the steering column with respect to an outer steering column tube of the steering column.

Furthermore, a steer-by-wire steering system for a motor vehicle is provided, comprising an electronically controllable steering actuator which acts on steered wheels, a feedback actuator to which a driver's request for a steering angle can be applied by a driver via a steering wheel and which outputs a feedback signal to the steering wheel in response to the driver's request and a driving state of the motor vehicle, and an adjustable steering column which can be adjusted between a retracted position and a deployed position by means of an adjustment mechanism. The steer-by-wire steering system is configured here to carry out the method described above.

FIG. 1 shows a steer-by-wire steering system 1. A rotational angle sensor (not illustrated), which senses the driver's steering torque applied by rotating the steering wheel 3, is attached to a steering shaft 2. The steering shaft 2 is part of a steering column 4 to which a feedback actuator 5 is attached, said feedback actuator 5 serving to transmit reactions from the roadway 6 to the steering wheel 3 and therefore to provide the driver with feedback about the steering and driving behavior of the vehicle. The driver's steering request is transmitted to a control unit (not illustrated) by means of the rotational angle, measured by the rotational angle sensor, of the steering shaft 2. The control unit actuates a steering actuator 7 in accordance with the signal of the rotational angle sensor and further input variables such as e.g. the vehicle speed, yaw rate and the like, which steering actuator 7 controls the position of the steered wheels 8. The steering actuator 7 acts indirectly on the steered wheels 8 via a tooth rack steering gear 9 and track rods 10 and other components. The steering column 4 is preferably adjustable, wherein there may be provision that the steering column can be adjusted by motor.

FIGS. 2 to 6 illustrate a steering column 4 of a steer-by-wire motor vehicle steering system, having the steering shaft 2 which is mounted so as to be rotatable about its rotational axis in an inner steering column tube 11. The inner steering column tube 11 is guided in a shiftable fashion in an outer steering column tube 12 along the longitudinal axis 100 of the steering shaft 2. The outer steering column tube 12 is pivotably mounted in a securing part 13. The securing part 13 can be fastened to the vehicle bodywork (not illustrated). The steering shaft 2 is connected at one end to the steering wheel 3. Arranged at the other end is the feedback actuator 5 which acts on the steering shaft 2. In order to increase the comfort of the driver, the steering column 4 can be adjusted in height in the adjustment direction 101 and in length in the adjustment direction 102. For this purpose, the steering column 4 has two adjustment drives. The adjustment drives each have an electric motor (not illustrated) with a threaded rod drive which comprises a worm shaft, arranged on the output of the electric motor, and a spindle nut, which is embodied as a worm wheel on its outer side, and the worm shaft, which is arranged on the output shaft of the electric motor, engages in the toothing of said worm wheel. The threaded rod is moved axially by rotation of the fixed spindle nut. The figures show in a side view the adjustment drive 111 which is provided for adjusting length and has a threaded rod 14 and spindle nut 15. The threaded rod 14 is fastened to the inner steering column tube 11, and the spindle nut 15 is secured to the outer steering column tube 12. The steering column 4 can be moved between a retracted position and a deployed position by the adjustment drive 111. In the retracted position, the steering wheel 3 is moved toward the feedback actuator 5 and is located in a stowed position. In this case, the inner steering column tube 11 is accommodated to a great extent in the outer steering column tube 12.

Figure 2:
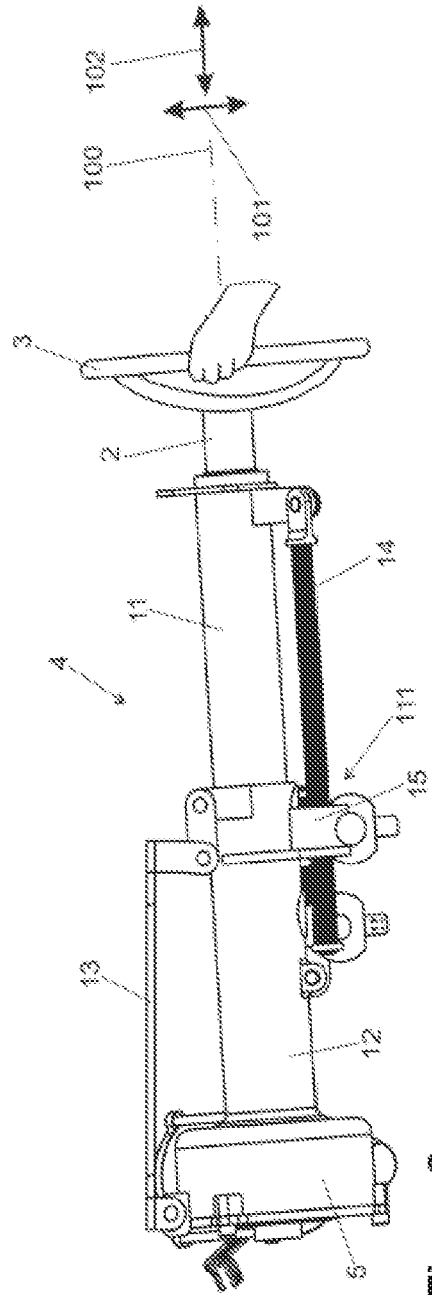
FIG. 2 is a schematic view of an adjustable steering column of a steer-by-wire steering system in a hands-on situation before an accident.

FIG. 2 shows a hands-on situation. The driver grips the steering wheel 3. If an accident, in particular a vehicle head-on impact, is detected in such a hands-on situation, a steering wheel airbag 16 is triggered without moving the adjustment drives 111 (see FIG. 3). In this manual driving mode it is ensured that the steering wheel 3 is at an optimum distance from the driver, and the airbag 16 is correspondingly designed for the impact of the driver against the steering wheel 3.

FIG. 4 shows a hands-off situation. The driver does not grip the steering wheel 3. The motor vehicle is in an autonomous or semi-autonomous driving mode. If such a hands-off situation is present, after the detection of an accident, in particular a vehicle head-on impact, the adjustment of the steering wheel 3 into an accident position is firstly carried out. An accident position is understood to be the position in which the driver impacts in an optimum way against the steering wheel 3 and therefore the risk of injury is particularly low. In order to determine the accident position, properties of the driver such as mass, sitting position, size, etc. can preferably be used. These properties can be determined by means of detection devices of the motor vehicle.

Figure 5:
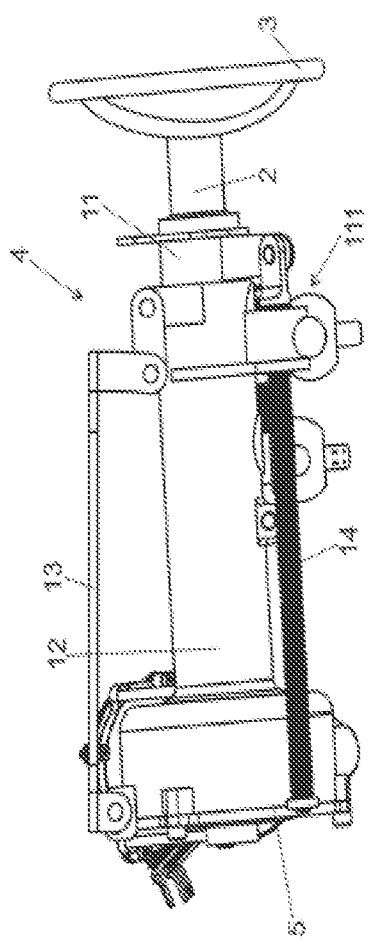
FIG. 5 is a schematic view of an adjustable steering column of a steer-by-wire steering system in a hands-off situation during an accident.

FIG. 5 illustrates that the steering wheel 3 has been moved in a longitudinal direction into a stowed position by means of the adjustment mechanism 111. In addition there can be provision that the steering wheel is completely adjusted upward in terms of its height in the adjustment direction 101. Therefore, the stowed position provides the driver with more comfort during the autonomous operation of the vehicle or provides the driver with the possibility of entering or exiting the vehicle more comfortably. The steering column 4 is located in the retracted position. This retracted position of the steering column 4 can correspond to the accident position.

There may be provision that in the case of an accident and in a hands-off situation the steering wheel is additionally moved into an advantageous rotational position. The feedback actuator 5 of the steering column 4 can be used for this purpose. In the case of an accident in a hands-off situation, the steering wheel 3 is preferably adjusted into a straight-ahead position. In this neutral position of the steering wheel, the steered wheels, if coupled mechanically to the steering wheel, are in a straight running position.

Figure 6:
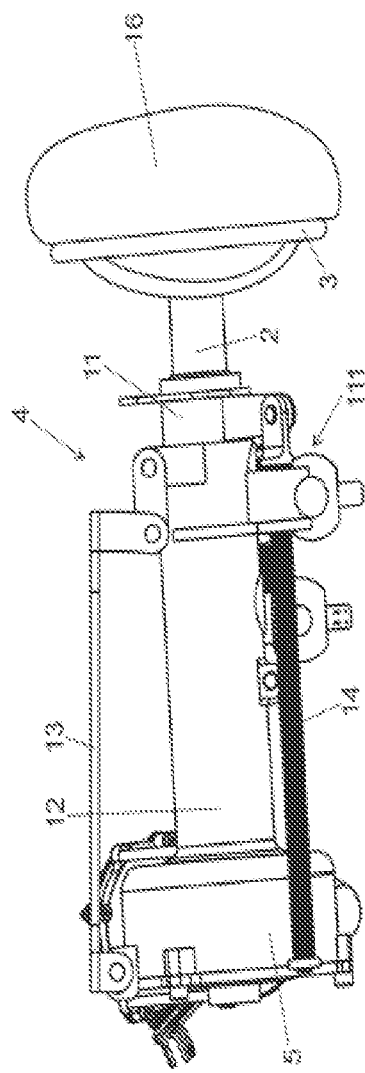
FIG. 6 is a schematic view of an adjustable steering column of a steer-by-wire steering system in a hands-off situation during an accident with a triggered airbag.

As shown in FIG. 6 the triggering of the airbag 16 takes place after the adjustment process of the steering column 4 or during the adjustment.

The steering column 4 preferably has an energy absorption device which, in the case of a vehicle head-on impact absorbs in a controlled fashion the energy which is input into the steering wheel by the driver.

The adjustment of the steering column 4 into the accident position can be carried out by means of a magnetic, pneumatic, hydraulic, electromechanical or pyrotechnic device and is not limited to the adjustment mechanism illustrated in the figures.

Figure 7:
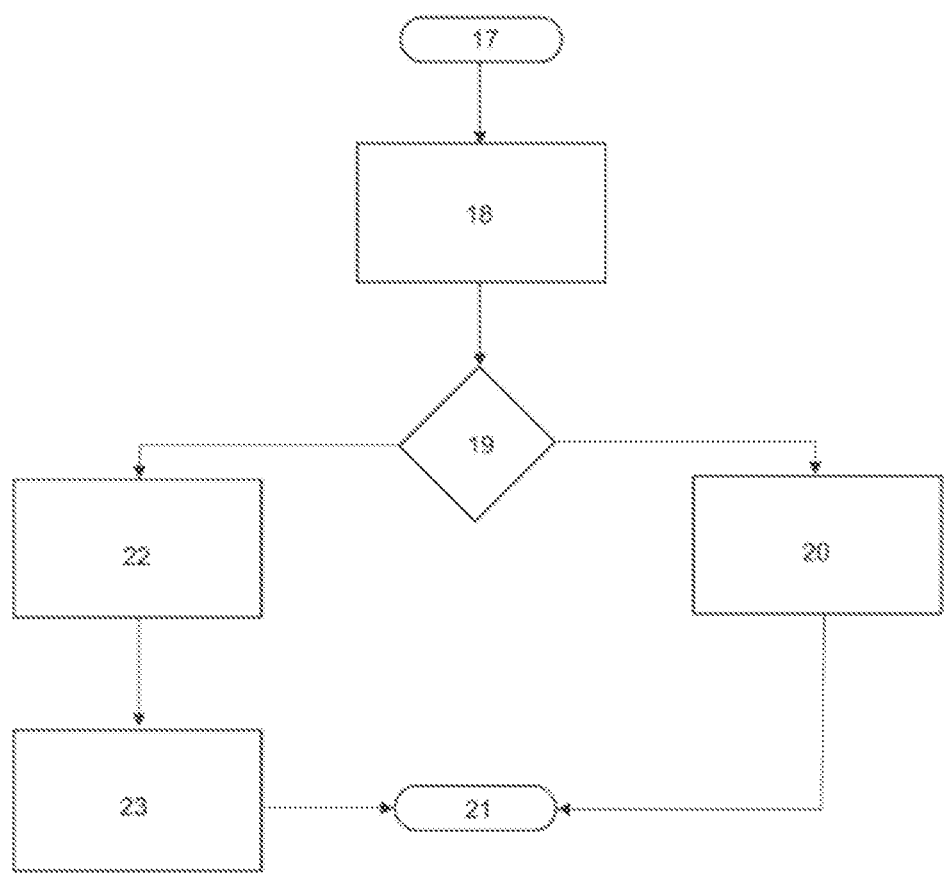
FIG. 7 is a block diagram of a controller of a vehicle occupant protection device of the steer-by-wire steering system of FIG. 1.

FIG. 7 illustrates a block diagram of the method for operating a vehicle occupant protection device. After the method 17 starts, in a first step 18 an accident, in particular a head-on impact, is detected. This is followed by an enquiry 19 as to whether or not there is contact between the driver's hand and the steering wheel 3. If a hands-on situation is present, in a subsequent step 20 the airbag is triggered and the method is ended 21. If, on the other hand, a hands-off state is detected, the steering wheel is moved into an accident position 22, the airbag is triggered 23 and the method is ended 21.

What is claimed is:

1. A method for operating a vehicle occupant protection device of a steer-by-wire steering system, wherein the steer-by-wire steering system comprises a steering wheel and an adjustable steering column connected to the steering wheel and is configured to adjust between a retracted position and a deployed position via an adjustment mechanism, and wherein the steer-by-wire steering system has a feedback actuator to which a request for a steering angle can be applied via the steering wheel, the feedback actuator configured to output a feedback signal to the steering wheel in response to the request and a driving state of the motor vehicle, the method comprising:

detecting an accident, detecting a hands-off situation or a hands-on situation, and when a hands-off situation has been detected, moving the steering column into an accident position via the adjustment mechanism and triggering a steering wheel airbag during or after the adjustment process and rotating of the steering wheel into an advantageous rotational position via the feedback actuator.

2. The method of claim 1 comprising:

when a hands-on situation has been detected after detection of an accident, triggering the steering wheel airbag in the current position of the steering column.

3. The method of claim 1 wherein the accident position comprises the retracted position of the steering column.

4. The method of claim 1 wherein the detected accident is a vehicle head-on impact.

5. The method of claim 1 wherein the advantageous rotational position is a neutral position of the steering wheel.

6. The method of claim 1 comprising:

absorbing energy input into the steering wheel when the driver impacts against the steering wheel via an energy absorption device.

7. The method of claim 1 wherein the adjustment mechanism has an electric motor with a threaded rod drive which shifts an inner steering column tube of the steering column with respect to an outer steering column tube of the steering column.

8. A steer-by-wire steering system for a motor vehicle, comprising:

an electronically controllable steering actuator which acts on steered wheels, a feedback actuator to which a request for a steering angle can be applied via a steering wheel and which outputs a feedback signal to the steering wheel in response to the request and a driving state of the motor vehicle, and an adjustable steering column which is configured to adjust between a retracted position and a deployed position via an adjustment mechanism, wherein the steer-by-wire steering system is configured to carry out the method of claim 1.

\* \* \* \* \*